Oct. 15, 1946.  W. M. PIATT  2,409,585
SUPERNATANT SELECTOR DEVICE FOR SLUDGE DIGESTION TANKS
Original Filed April 16, 1942
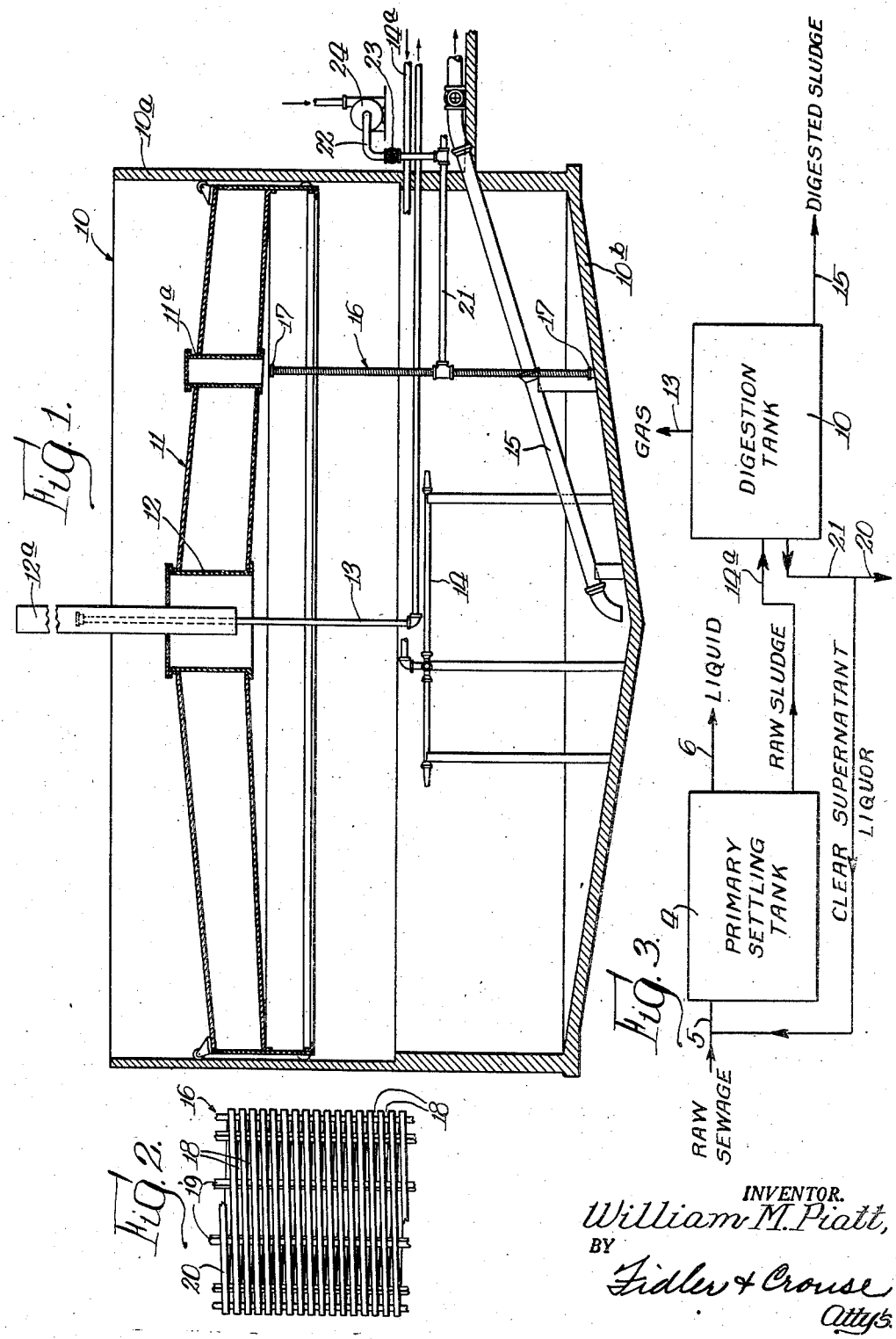
INVENTOR.
William M. Piatt,
BY
Fidler & Crouse
Attys.

Patented Oct. 15, 1946

2,409,585

UNITED STATES PATENT OFFICE 2,409,585

SUPERNATANT SELECTOR DEVICE FOR SLUDGE DIGESTION TANKS

William M. Piatt, Durham, N. C., assignor to Pacific Flush Tank Company, Chicago, Ill., a corporation of Illinois Continuation of application Serial No. 439,188, April 16, 1942. This application July 21, 1945, Serial No. 606,412

3 Claims. (Cl. 210—2)

My invention relates to apparatus and method for the digestion of sewage sludge, and it has to do particularly with control of the removal of supernatant liquor from digestion tanks.

The present application is a continuation of my copending application Serial No. 439,188 filed April 16, 1942.

In the operation of sewage treatment plants, it is quite customary to first introduce raw sewage into a preliminary settling tank wherein settleable solid materials are separated from the liquid, the liquid being discharged to other portions of the plant for further treatment or disposal while the solid material or sludge is transferred to a digestion tank where it is acted upon by anaerobic bacteria. In the digestion tank, the solids undergo decomposition, a series of reactions resulting in the destruction of the organic portions of the sludge which have objectionable qualities. In the handling of ordinary domestic sewage, between forty and sixty per cent of the solid matter in the raw sludge will be destroyed and released as gas during the digestion period. Raw sludge of this character as added to the digester may contain between ninety-four and ninety-eight per cent water, while the digested and completely treated sludge, as withdrawn from the digester, will contain from about eighty-eight to ninety-four per cent water or moisture. In the digestion process there is naturally an increased concentration of the solids in the digested sludge as withdrawn from the digester and, because of the considerable quantity of solids which may be destroyed, as above explained, it will be appreciated that there will be large quantities of liquid, usually termed "supernatant liquor," which must be withdrawn from the digester and disposed of. This liquor will generally collect or separate to form substantially horizontal strata or layers of clear liquid and, while this stratification may occur at almost any level in the digestion tank, the clear liquid is usually found in the upper half of the contents of the tank although not at the very top.

During the digestion action, those solids which are more completely digested and are therefore not being acted upon by bacteria and releasing gases, will tend to settle to the bottom of the digestion tank. These solids will normally have most of the organic material digested from them so that they will contain the inert and heavier portions of the solids, which will cause them to settle in the bottom of the tank, and as they settle they will release some of the liquid by compacting and concentrating at the bottom of the tank. On the other hand, the partially digested or undigested solids which are undergoing active digestion and consequently releasing gases which tend to rise vertically, will keep the upper portion of the digestion tank more or less stirred up. Depending upon the quantities of raw solids which are being added, the temperature of the digestion tank and other uncontrollable factors, the digestion tank contents are rather unpredictable as to the nature of the material which may be found at any one point in the tank and it is for that reason, as above stated, that the location and quantity of supernatant liquor which may be suitable for withdrawal is highly variable and the selection and removal of the supernatant liquor containing least quantities of solids presents a difficult problem.

The usual method of disposal of supernatant liquor is to return it to the inlet of the sewage plant for treatment along with the raw sewage, that is, either before or after the raw sewage has passed through the primary settling tank. In view of the fact that this supernatant liquid contains some solids from an anaerobic digester in which the reactions take place in the absence of oxygen, these solids have a very high affinity for oxygen and will deplete oxygen in the raw sewage, thereby causing septic action to take place which, when it occurs, disturbs the proper functioning of the entire plant. Consequently, it is essential that the supernatant liquor sent back into the plant contain as little solid material from the digester as possible so as to lessen this upsetting effect on the entire sewage treatment process.

Heretofore, digestion tanks have taken various forms and various means have been provided for supernatant liquor draw-off, all of which, however, are subject to objection from the foregoing standpoints. For example, digestion tanks have been employed with either a fixed or a floating cover and they have been provided with one or more pipes at the side of the tank for removing the supernatant liquor from the digester. In the use of a floating cover type of tank, it is quite important that a multiplicity of pipes be provided at different elevations along the side of the tank so that the operator may at will select a point of supernatant liquor draw-off from that stratum where, in his opinion, the best quality of liquor occurs. This same arrangement may be employed with a fixed cover or, as in usual practice, a single point of take-off of material may be provided, with the material merely overflowing from this point whenever solids are added to the tank. With these prior arrangements, it is necessary to give very careful attention to manual control of the draw-off, observing all during the draw-off period whether the material is of a character which will permit the return of the same to the treatment plant. Even with very careful control, it is not possible to always return the best quality of material to the plant for retreatment, thereby resulting in an upsetting of the treatment process as above explained. Moreover, the withdrawal is done periodically, rather than continuously throughout the digestion process, so that the rate of return during such periods is relatively high, thereby tending to upset the treatment process. Also, with these prior arrangements, constant attention is required, thereby tending to increase operating personnel necessary for proper operation of the plant.

One of the objects of my invention is to provide improved sewage digestion means including improved supernatant liquor draw-off means by which manual control and guesswork are eliminated in the selection of the supernatant liquor to be drawn off, and by which all such liquor which is properly clarified is drawn off.

Another object is to provide means for selectively discharging supernatant liquor from a sewage digestion tank.

Still another object is to provide improved means for automatically and selectively discharging supernatant liquor from a digestion tank, at varying levels therein where the supernatant liquor is sufficiently clarified and free of suspended solids that its oxygen demand is minimized and it may be retreated with raw sewage without upsetting the normal treatment functions of the sewage plant as a whole.

An additional object is to provide means for automatically selecting and discharging supernatant liquor from a digestion tank, at varying levels therein, according to the solids content thereof, whereby only that liquid which is clarified to a predetermined extent and is substantially free of suspended solids is discharged.

A more specific object is to provide a digestion tank having therein a vertically disposed selector discharge device which extends substantially throughout such depth of the material in the tank where the clearest liquor is most likely to occur, which selector device is perforated or slotted substantially throughout its length so as to afford a straining action predetermined in character and whereby only clarified liquid substantially free of suspended solids is discharged.

A further object is to provide a sewage treatment system for digesting sewage by anaerobic decomposition, in which supernatant liquor evolved in the digestion process is withdrawn from the digestion tank and introduced into the raw sewage to be treated, the withdrawal being continuous throughout the process and limited to substantially clear liquor whereby the tendency to deplete the oxygen in the raw sewage is held at a minimum throughout the process.

Still another object is to provide a novel method of withdrawing supernatant liquor from a digestion tank so that only the clearest liquor is withdrawn, the withdrawn liquor thus being of a character that it may be returned to the raw sewage without materially depleting the oxygen content thereof.

Other objects and advantages will become apparent as this description progresses and by reference to the drawing, wherein:

Figure 1 is a vertical, sectional view of one form of sewage sludge digestion tank embodying my invention;

Fig. 2 is a separate fragmental view of one form of selector or strainer device that may be employed in carrying out my invention; and Fig. 3 is a diagrammatic view of a sewage treatment system including the digestion tank shown in Fig. 1.

In the drawing, I have shown my invention applied to sewage treatment system including a digestion tank 10 of conventional form having an annular side wall 10$^a$ and a bottom 10$^b$. The tank is provided with a so-called floating cover 11 having the usual gas-collecting dome 12, gas pipe housing 12$^a$ and gas discharge pipe 13. Raw, undigested sludge from any suitable source, such as a primary clarifier 4, is fed to the digester 10 through piping 14 including an inlet pipe 14$^a$, and the digested sludge is discharged from the bottom of the tank through a draw-off pipe 15. It will be understood that, although I have shown my invention as applied to a floating cover type of tank, it may be equally well applied to the well-known fixed cover or any other conventional type of sludge digestion tank. Raw sewage may be supplied to the primary clarifier or settling tank 4 by an inlet 5, and the liquid separated from the solids in the clarifier may be discharged by an outlet 6.

In carrying out my invention, I provide a selector device which is disposed within the digesting material and which is constructed and arranged to automatically draw off supernatant liquor therefrom at any elevation therein where such liquor ordinarily collects and is clarified or solids content reduced to a predetermined extent. More particularly, I provide a perforated or slotted selector device 16 (Fig. 2) which is mounted vertically within the digestion tank and which extends from near the bottom of the tank to a point near the top of the material therein. This selector device 16 takes the form of an elongated tubular member having its opposite ends blocked or plugged as at 17 and its intermediate portion perforated or slotted to provide annular or circumferential series of superimposed elongated slots or orifices 18. The particular strainer shown in the drawing (Fig. 2) may take the form of a plurality of circumferentially-spaced vertical supports 19 having a rectangular, wire-like member 20 wound spirally thereabout to provide the slots 18. The slots 18 may vary from $\frac{1}{16}''$ to $\frac{3}{8}''$ in width, and I have found that excellent results may be obtained by using slots about $\frac{1}{8}''$ in width. With this arrangement, the orifices or slots 18 extend from near the bottom 10$^b$ of the tank substantially throughout the depth of the material therein so that supernatant liquor sufficiently clarified or free of suspended solids to pass through the orifices 18, at any point or level within the depth of the digesting material, will be drawn off. The slots 18 could, of course, be located only in the upper half of the tank where the clarified liquor usually occurs in normal operation. The rectangularly shaped slots 18 have squared edges that are highly conducive to an effective straining action in that solids suspended in the supernatant liquor will initially tend to collect and adhere around the edges of the slots, thereby reducing the area of the same and tending to provide a very effective straining action. That is to say, the solids that have collected around the edges of the slots provide a medium which not only further restricts the slots but also provides a medium to which solids in the material tending to pass through the slots will adhere so that the material which actually passes through the slots for draw-off purposes will be free or practically free of suspended solids. Consequently, with this arrangement, automatic selection and draw-off, without any manual control or guesswork, is provided, the best supernatant liquor for return to the raw sewage for further treatment is discharged, and the likelihood of upsetting the treatment plant as a whole is eliminated. Furthermore, the return of such liquor to the inlet 5 will be continuous throughout the digestion process without excessively depleting the oxygen content of the raw sewage.

It will be understood that, while I prefer to use a selector device like that illustrated in Fig. 2, other forms of slotted or perforated devices may be employed. Also, while the slots 18 are preferably of uniform size throughout the tubular member, they may be varied somewhat, the main purpose being to provide a selector device having a straining action which, cooperatively with the material in the tank, will effect a properly clarified supernatant liquor discharge.

The selector device 16 is connected to a draw-off pipe 21 which is adapted to return the supernatant liquor to the inlet 5, or if desired to a point beyond the primary settling tank 4, where it is added to raw incoming sewage for retreatment along with the raw sewage in the usual manner. Or, if desired, this draw-off pipe 21 may lead to any other point of final disposal permitted in the operation of the sewage plant, as indicated by the branch pipe 20. Also, in the use of a floating cover, it is preferably provided with a selector housing 11ᵃ which accommodates the selector 16 as the cover is raised and lowered within certain limits.

In the use of a selector device 16 such as described, there may be times when the slots 18 may tend to become clogged to an extent impairing the draw-off capacity of the device. To take care of that condition, I provide means for back-flushing or backwashing the device to free the slots that may become clogged. This backwashing is accomplished by feeding a washing fluid backwardly through the discharge pipe 21. To this end, I provide a backwashing conduit 22, which may normally be closed by a valve 23, and a pump 24 which may be employed for forcing the backwashing fluid or liquid through the pipe 21 and into the device 16. In some instances, when a proper head pressure is available, the pump 24 may be dispensed with and the fluid fed backwardly by gravity. The backwashing fluid may be ordinary city water or it may take the form of any reasonably clear fluid that may be available in a sewage system. I have found that excellent results may be obtained by forcing the backwashing fluid through the device at a pressure of approximately fifty pounds per square inch, but this pressure may, of course, be varied without departing from my invention.

I believe that the operation and advantages of my invention will be well understood from the foregoing description. By this arrangement one can secure the removal of the best supernatant liquor from a digestion tank with a minimum of difficulty and a minimum of operating control. If the liquor is returned to the inlet of the plant for retreatment with raw sewage it will not cause an upsetting of the plant operation as a whole, thereby insuring the most effective use of the actual plant treatment units. By eliminating the upsetting effect occasioned by intermittent return of poor supernatant liquor, the main units of the treatment plant may be designed without the usual extra capacity which has been deemed necessary in order to take care of the foregoing condition. This will naturally result in a considerable saving of cost of plant structure in addition to the improved operation and efficiency of the treatment plant as a whole. In addition to limiting the liquor returned to that which is substantially clear, the present invention provides means for returning the liquor constantly throughout operation of the plant at a relatively low rate of flow so that the oxygen demand due to such return is held at a minimum.

I claim:

1. In structure of the class described, a closed tank free of obstructions preventing horizontal flow of liquid material in said tank, said tank being adapted to receive sewage sludge for digestion thereof and without mechanical agitation, means for passing sludge into said tank to be digested, and means for automatically discharging the supernatant liquor from varying levels at which it may accumulate and substantially free of suspended solids, including a tubular member disposed vertically in said tank and extending from near the top thereof downwardly through at least the upper half of said tank, said member being provided with elongated slots of a width varying from $\frac{1}{16}''$ to $\frac{3}{8}''$, said slots being located both circumferentially around and longitudinally of said member whereby supernatant liquor at varying levels in said tank which is freed sufficiently of suspended solids to pass through said slots will pass into said tubular member, and means including a generally horizontal closed conduit connected to said tubular member between its ends for discharging the liquor from said tubular member to a point of disposal.

2. In a structure of the class described, a digestion tank for receiving sewage sludge and in which digestion of said sludge takes place with resultant formation of variably located horizontal strata of sludge and supernatant liquor having suspended solids content which vary throughout said several strata, means including a conduit extending into said tank for admitting sludge to be digested, means including a conduit extending from said tank for withdrawing digested sludge therefrom, and means for continuously and automatically selecting and drawing off supernatant liquor from those strata, wherever located, wherein the solids contents have been reduced to a predetermined extent, said last-named means including an elongated, hollow selector member extending in a generally vertical direction in said tank, said selector member having a plurality of elongated slots therein of a width varying from $\frac{1}{16}''$ to $\frac{3}{8}''$ and disposed in a longitudinally extending, closely spaced series projecting to beyond the upper and lower limits of the strata from which supernatant liquor is to be drawn off, said openings providing inlets into which supernatant liquor will pass from those strata in which the solids content has been reduced to said predetermined extent and through which the solid material in the remaining strata will not pass but will build up on the exterior of said selector member at said openings to form with the adjacent imperforate portions of said selector member a substantially enclosed discharge conduit leading from the portion or portions of said selector member into which supernatant liquor is drawn and an imperforate draw-off conduit connected to said selector member at a predetermined height therein and extending therefrom and out of said tank.

3. In a method of treating sewage wherein raw sewage is passed to a primary settling zone and the settled sludge from said primary settling zone is passed to a digestion zone wherein the sludge is digested by anaerobic decomposition during which decomposition horizontal strata of sludge and supernatant liquor are formed, the supernatant liquor at one stratum, at least, having a suspended solids content which will pass through orifices of from $\frac{1}{16}''$ to $\frac{3}{8}''$ in size, which stratum of supernatant liquor is in condition to be withdrawn and passed to the raw sewage for retreatment therewith, the steps of withdrawing supernatant liquor from said digestion zone through orifices of a width varying from $\frac{1}{16}''$ to $\frac{3}{8}''$ formed in an elongated selector member extending in a generally vertical direction in said digestion zone, said orifices being disposed in a longitudinally-extending, closely-spaced series projecting to beyond the upper and lower limits of the strata from which supernatant liquor is to be drawn off, whereby supernatant liquor is drawn into said orifices at said one stratum and the solids contents of the remaining strata block off the orifices at those strata, withdrawing the liquor from said selector member through an imperforate draw-off conduit connected to said selector member, and delivering such liquor to the raw sewage passing to said settling zone.

WILLIAM M. PIATT.